(12) United States Patent
Nakama et al.

(10) Patent No.: US 7,319,559 B2
(45) Date of Patent: Jan. 15, 2008

(54) SPECTRAL OPTICAL ELEMENT

(75) Inventors: Kenichi Nakama, Tokyo (JP); Naoko Hikichi, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 301 days.

(21) Appl. No.: 11/038,535

(22) Filed: Jan. 21, 2005

(65) Prior Publication Data

US 2005/0226559 A1    Oct. 13, 2005

(30) Foreign Application Priority Data

Jan. 22, 2004    (JP) .................... P2004-014715

(51) Int. Cl.
  *G02B 5/18*    (2006.01)
  *G02B 1/10*    (2006.01)
(52) U.S. Cl. ...................... 359/569; 359/580
(58) Field of Classification Search ................ 359/576, 359/571, 569, 566, 580, 581
See application file for complete search history.

(56) References Cited

U.S. PATENT DOCUMENTS 6,185,043 B1 *    2/2001    Imamura ................... 359/619
6,404,554 B1 *    6/2002    Lee et al. ................... 359/576
6,947,215 B2 *    9/2005    Hoshi ........................ 359/576

FOREIGN PATENT DOCUMENTS

JP           08056049    *    2/1996

* cited by examiner

*Primary Examiner*—Alessandro Amari
(74) *Attorney, Agent, or Firm*—Whitham Curtis Christofferson & Cook, PC

(57) ABSTRACT

The present invention targets a spectral optical element that outputs a light inputted at a predetermined incident angle to a predetermined direction depending on its wavelength. A spectral optical element according to the present invention includes a transmission diffraction optical element, and an optical phase control element that is fixed and arranged to be opposed to a diffracted light output surface of the transmission diffraction optical element so that the diffracted light is inputted therein. Then, this optical phase control element is constructed so that an optical length with respect to a light passing through the optical phase control element is changed in accordance with change of a diffraction angle of the diffracted light depending on the wavelength.

17 Claims, 5 Drawing Sheets

$\lambda b = \lambda a / 2$

SPECTRAL OPTICAL ELEMENT

BACKGROUND OF THE INVENTION

1. Field of the Invention

The present invention relates to a spectral optical element that is used in a spectral analytical instrument and an optical apparatus using a plurality of wavelengths, and particularly, the present invention relates to a spectral optical element using a diffraction optical element.

2. Description of the Related Art

A diffraction optical element represented by a diffraction grating has been widely used in a spectral analytical instrument for analysis of an optical spectrum. In the spectral analysis, a high-energy usability over a broad band is required. In order to obtain high diffraction efficiency in the broad band, a reflection diffraction grating is suitable. In addition, the reflection diffraction grating has been widely used in the spectral analytical instrument because a change ratio of a diffraction angle with respect to a wavelength, namely, a wavelength angle dispersion property is favorable.

The reflection diffraction grating, in which a grating interval of the diffraction grating is about a wavelength, has a large wavelength dispersion and has a broad band and a high efficiency for a TM (transverse magnetic) mode, however, this involves a problem that the efficiency thereof is low for a TE (transverse electric) mode and a wavelength loss property does not become stable. Such a diffraction grating indicates a complex wavelength loss property because it is operated in a resonance region so that it cannot realize stable operation over a broad band.

On the contrary, a diffraction grating, in which the grating interval is ten times and over the wavelength, uses a high-order diffracted light in a so-called Littrow mounting or near arrangement, and this makes it possible to realize a high efficiency in a high wavelength dispersion and to lower a polarization dependent loss (PDL) (for example, refer to Hiroshi Kubota, "Wave Optics", Iwanami Shoten, 1971, chapter ten) However, an available band pass is restricted by a free spectrum range, and generally, it is not more than 100 nm. In such a diffraction grating, diffracted light of many orders are generated, so that diffracted light of unnecessary orders enter with predetermined output angle from a relation between wavelength, incident and output angles, and a grating constant. Therefore, the available band pass is limited.

On the other hand, the transmission diffraction grating has been also widely used depending on a purpose. The transmission diffraction grating is preferable to realize a low PDL and high diffraction efficiency in a specific wavelength.

Although the transmission diffraction grating can realize both a low PDL and high diffraction efficiency in a specific wavelength band, the band pass is not broad. In addition, in light of a wavelength $\lambda$ and a $\lambda/m$ (m is a natural number not less than 2), diffracted light of a diffraction order of several m having the same diffraction angles are generated, and thereby, its band pass is limited.

SUMMARY OF THE INVENTION

The present invention has been made taking the foregoing problems into consideration and an object of which is to provide a spectral optical element having high diffraction efficiency, a low PDL, and a small wavelength dependency of energy of a diffracted light in a broad wavelength band.

The present invention targets a spectral optical element that outputs a light inputted at a predetermined incident angle to a predetermined direction depending on its wavelength, and in order to solve the above-described problems, the following means are utilized.

A spectral optical element according to the present invention may comprise a diffraction optical element, and an optical phase control element that is fixed and arranged to be opposed to a diffracted light output surface of the diffraction optical element so that the diffracted light is inputted therein. Then, an optical function of the optical phase control element effected on the incident light is changed when the diffraction angle of the diffracted light by the diffraction optical element is changed depending on the wavelength.

At least one of an optical intensity attenuation amount, or a phase change amount, or a reflection amount in the optical phase control element is changed by the optical function.

The light to be diffracted by the diffraction optical element has a diffraction angle that is different for each wavelength. Accordingly, it is possible to compose the diffraction optical element so that an incident angle to an optical phase control element arranged on a diffracted light output surface is changed depending on a wavelength. In such a structure, in the light passing through the optical phase control element, its optical length is changed in response to its incident angle, so that a physical amount such as an optical intensity attenuation amount and a phase change amount is changed. In addition, a reflection amount by the optical phase control element is also changed. Therefore, it is possible to give a predetermined wavelength property to a spectral optical element for each wavelength.

It is preferable that the diffraction optical element and the optical phase control element are directly laminated. By directly laminating two optical elements to be integrated, a positional relation between the diffraction optical element and the optical phase control element is fixed, so that adjustment is not needed.

With respect to the incident light including at least two different wavelength components, a product of a diffraction efficiency for a predetermined wavelength in the diffraction optical element and the optical intensity attenuation amount by the optical phase control element for the incident light of the same wavelength diffracted by the diffraction optical element is constant in at least two different wavelengths.

Thereby, a wavelength dependency of an intensity of a diffracted light can be compensated over a broad wavelength band, so that it is possible to take out even output energy.

In addition, with respect to the incident light including at least two different wavelength components, a product of the diffraction efficiency for a predetermined wavelength in the diffraction optical element and the reflection amount by the optical phase control element for the incident light of the same wavelength diffracted by the diffraction optical element is constant in at least two different wavelengths.

By this means, the wavelength dependency of an intensity of a diffracted light can be also compensated, and this makes it possible to take out even output energy over a broad wavelength band and to provide a spectral optical element with a small polarization dependency.

In addition, the optical phase control element gives a phase change amount having the same value and the inverse code to a phase change amount of any two orthogonal polarized lights that are diffracted by the diffraction optical element.

For example, if the optical phase control element is composed so as to have a phase control amount that compensates a polarization mode dispersion by the diffraction optical element with respect to each wavelength $\lambda$, it is possible to take out an output light having a small polarization mode over a broad wavelength band.

In addition, when a diffraction angle of an n order diffracted light (an absolute value of n is an integer not less than 1) of a first wavelength due to the diffraction optical element is the same as that of a m order diffracted light (an absolute value of m is an integer not less than 2) of a second wavelength that is shorter than the first wavelength and the light inputted in the optical phase control element is inputted from the same direction, the light or the first wavelength is passed through the optical phase control element and the light of the second wavelength is reflected on the optical phase control element.

When the first wavelength is m/n (>0) times the second wavelength, the n order diffracted light of the first wavelength and the m order diffracted light of the second wavelength have the same diffraction angles, however, according to the present invention, a differentiation due to the wavelength becomes possible, so that it is possible to make an available wavelength band as a spectral optical element broader In addition, the optical phase control element may comprise a cyclic structure having a cycle not more than ½ of the first wavelength and having a cycle not less than ½ of the second wavelength that is shorter than the first wavelength.

According to such a structure, the diffracted light of a long wavelength band can be directly outputted without diffraction, and the diffracted light of a short wavelength band can be outputted to another direction with diffracted by the optical phase control element. Thereby, it is possible to use one spectral optical element for two wavelength bands at the same time.

It is preferable that the diffraction optical element is constructed by combining two and more materials having different refractive indexes. Particularly, it is preferable that an apparent refractive index or the diffraction optical element of the diffraction optical element is made to coincide with a desired value depending on a cubic measure occupied each material.

According to such a structure, it is possible to control a refractive index of the diffraction optical element into an optimum value that is difficult to obtain by a single material, and it is possible to realize the spectral optical element in response to a design of a broad band and high diffraction efficiency.

It is preferable that the optical phase control element is composed of an optical multiple layer film having a laminar type cyclic structure made of a material transparent in the wavelength band used. An optical multiple layer film or a laminar type cycle structural body can be directly laminated on the diffraction grating.

It is preferable that the diffraction optical element is a diffraction grating having a cyclic concavo-convex structure made of a material transparent in the wavelength band used.

In addition, it is preferable that the spectral optical element may comprise a lens for condensing a light that is outputted from the optical phase control element. By mounting the diffraction grating and the optical phase control element on a micro lens, an integrated optical system can be small, so that its reliability can be enhanced.

In the present invention, the diffraction optical element is preferably constituted by a transmission diffraction optical element in which the incident light is input to a surface other than the light output surface.

According to the structure of the present invention, it is possible to provide a spectral optical element, which has a high diffraction efficiency and a low PDL in a broad wavelength band and energy in which diffracted light can be allocated with a TE mode and a TM mode that are well-balanced.

DETAILED DESCRIPTION OF THE INVENTION

Figure 1:
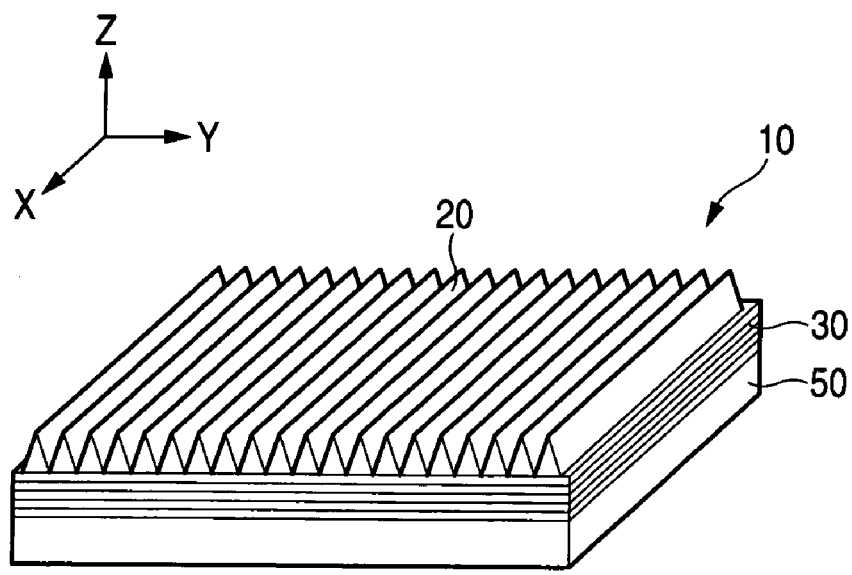
FIG. 1 is a schematic view showing a basic structure of a spectral optical element according to the present invention.

With respect to the embodiments of the spectral optical element according to the present invention, its basic structure will be described along with a manufacturing step.

At first, an optical phase control element is formed on a surface of one platy glass substrate. As the optical phase control element, an optical multilayer film is used. The optical multilayer film can obtain desired wavelength property and phase control property by a design of a combination of a refractive index decided by a material of an optical film as a unit and a thickness of the film. On the basis of a predetermined design, a film structure is decided to deposit in order to obtain the film structure that is designed by a vapor deposition apparatus having an optical monitor.

Consequently, a diffraction optical element is manufactured with laminated on this optical phase control element. As the diffraction optical element, a blaze type and a lamina type are manufactured.

In the case of the blaze type, a cyclic concavo-convex structure made of a transparent material is formed with laminated on a surface of the multilayer film. According to the present embodiment, the cyclic concavo-convex structure is formed by molding a sol-gel material. Its specific method will be described below.

A forming material liquid adding polyethylene glycol to a sol liquid mainly composed of tetraethoxysilane and an acid solution is applied on a glass substrate, and this glass substrate is attached to a vacuum press apparatus so as to oppose a forming mold. On a surface or a forming mold, a mould release material has been deposited in advance. Evacuating air from a press apparatus, the forming mold is pressed against the soft gel film. The gel film is cured with held at 60° C. as it is. After returning the press apparatus into air, the forming mold is released from the gel film. Then, the cyclic concavo-convex structure, on which grooves of the forming mold is transcribed, is formed on the surface of the gel film. By heat-treating this cyclic concavo-convex structure at 350° C., the transcription type diffraction grating is obtained.

In addition, in the case of the lamina type, after forming the transparent film on the basis of a predetermined design, a Cr film is deposited by sputtering on its surface, which becomes a mask upon etching. By patterning this Cr film by a photolithography and etching, this Cr film is patterned to manufacture an etching mask. By using an inductive coupled plasma-reactive ion etching (ICP-RIE) apparatus via this mask, a parallel groove is formed on a transparent film by dry etching to manufacture a predetermined structure. As an etching gas, a $C_3F_8$ gas and a $CF_4$ gas are used in the case of alumina and in the case of a multilayer film made of a quartz and a tantalum oxide, respectively.

It is possible to laminate a plurality of cyclic structural bodies of the laminar type. After manufacturing the first cyclic structural body, the transparent film is formed on the surface again. By processing this transparent film in the same way, the structure having the laminar type cyclic structural body laminated thereon can be manufactured.

As shown in FIG. 1, a typical embodiment or a spectral optical element 10 is configured so that a transmission diffraction optical element 20 and an optical phase control element 30 are laminated on one surface of a glass substrate 50. In this case, a Z axis is defined in a vertical direction on the surface of the glass substrate 50; X and Y axes running at right angles to one another in parallel are defined on the glass substrate 50; and a cycle direction of the transmission diffraction optical element 20 is defined as a Y axial direction.

Figure 2:
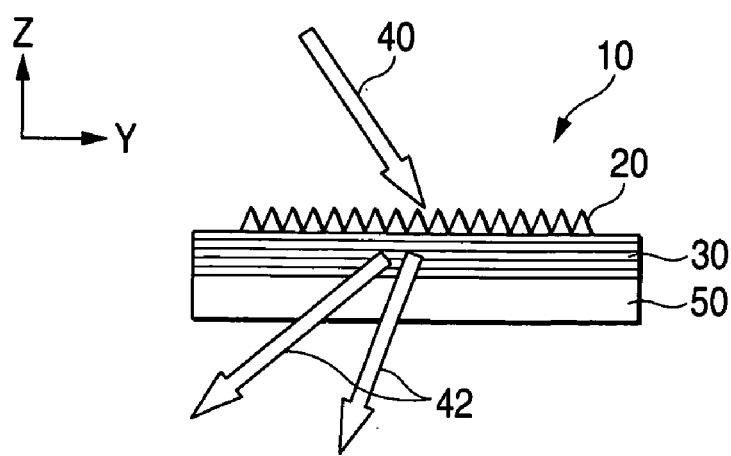
FIG. 2 is a sectional schematic view showing a basic structure of the spectral optical element according to the present invention.

FIG. 2 shows a cross section that is parallel with the YZ plane of this spectral optical element. When inputting an incident light 40 from the side where the transmission diffraction optical element 20 is located into the spectral optical element 10, the incident light is diffracted at a predetermine diffraction angle for each wavelength by its cyclic structure to be inputted in the optical phase control element 30 as a diffracted light 42.

Figure 3:
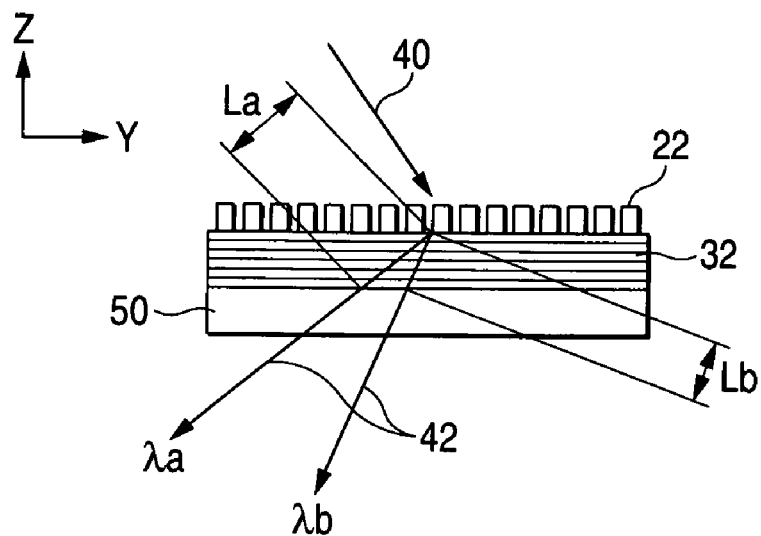
FIG. 3 shows an operational principle of a spectral optical element according to a first embodiment.

In the optical phase control element, if the incident angle is changed for each wavelength, the optical length passing through the element is changed, so that the optical intensity attenuation amount and a phase control amount are changed. In addition, if the incident angle is changed, the reflection amount is also changed. For example, when the incident light 40 includes wavelength components λa and λb, as shown in FIG. 3, the diffraction angles are different at λa and λb, so that refractive indexes R (λa) and R (λb) of the optical phase control element 30 are generally different. In addition, with respect to a light path length L in the optical phase control element 30, L=La for the light of the wavelength λa and L=Lb for the light of the wavelength λb are generally different.

On the other hand, an average refractive index n of the optical phase control element depends on a wavelength, so that n (λa) and n (λb) are generally different. However, an extent of variation depends on a material composing the optical phase control element and a structure of the element. In other words, the optical intensity attenuation amount and the phase control amount received by the light passing through the optical phase control element depend on an optical length nL. In this case, since both of n and L are changed depending on the wavelength, the optical intensity attenuation amount and the phase control amount received by the incident light in the optical phase control element are generally different for each wavelength.

First Embodiment

Hereinafter, the first embodiment according to the present invention will be described.

In a wavelength multiple optical communication, a signal light of a plurality of wavelengths is used, and for example, the wavelength multiple optical communication may include a broad wavelength band not less than 100 nm. If the transmission diffraction optical element is used in the broad wavelength band, in response to a normal wavelength, the diffraction efficiency is changed. In other word, if the light including a plurality of wavelengths passes through such a transmission diffraction optical element, the energy of this diffracted light is changed depending on a wavelength. Accordingly, the intensity of the entire diffracted light is changed depending on a wavelength.

As shown in FIG. 3, the optical phase control element according to the present embodiment is an optical multilayer film 32 that is laminated on the substrate 50. This optical multilayer film 32 is designed so as to compensate for variation of the diffraction efficiency of the diffraction grating 22 depending on the wavelength. In this case, since the diffraction angle is changed depending on the wavelength, as shown in FIG. 3, the optical length in the optical multilayer film 32 of the diffracted light is also changed depending on the wavelength.

Therefore, by designing the optical multilayer film 32 so that the product of the diffraction efficiency in two wavelengths and the optical intensity attenuation amount by the optical multilayer film becomes constant, it is possible to compensate the wavelength dependency of the diffracted light intensity. Thereby, it is possible to obtain the spectral optical element capable of taking out an even output energy over a broad wavelength band. This structure is suitable for a case that receiving the light at an even intensity is desirable such as a case of receiving spectral light and processing it.

Figure 4:
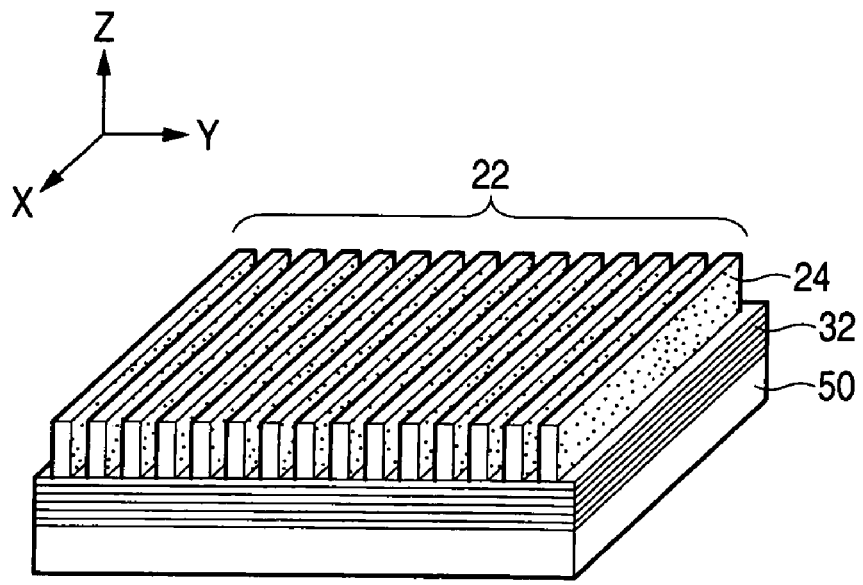
FIG. 4 is a schematic view showing the spectral optical elements of first, second, and fourth embodiments.

As shown in FIG. 4, the spectral optical element according to the present embodiment has a structure such that the laminar type transmission diffraction grating 22 as the transmission diffraction optical element is laminated on the optical multilayer film 32 as the optical phase control element. In the laminar type transmission diffraction grating 22, differently from the blaze type diffraction grating shown in FIG. 1, rectangular convex parts (ridge parts) 24 are periodically arranged on the substrate to form the grating.

The laminar type transmission diffraction grating according to the present embodiment is formed by applying a groove process to an $Al_2O_3$ layer of a refractive index 1.6. Here, a grating interval (pitch) is defined to be 1,427 nm; a depth of a groove of a grating is 2,400 nm, and a width of the ridge part 24 of the grating is defined to be 799 nm. In this diffraction grating, the diffraction efficiency of the first order diffracted light at the wavelength λ=1,350 nm with respect to a TM mode incident light of the incident angle of 27.5° is 88%; the diffraction efficiency of the first order diffracted light at the wavelength λ=1,500 nm with respect to a TM mode incident light of the incident angle of 27.5° is 92%; and the diffraction efficiency in these two wavelengths is changed by 4%.

On the other hand, with respect to the diffraction angle for each wavelength, the diffraction angle is 17.6° at λ=1,350 nm, and it is 21.6° at λ=1,500 nm, so that assuming that the film thickness in the vertical direction of the corresponding substrate upon inputting is made T, an effective film thickness in each wavelength is 1.049 T at λ=1,350 nm, and it is 1.075 T at λ=1,500 nm. In consideration of these effective film thickness, the optical multilayer film 32 is made of nine layers to be 1.24 λL/0.22 λH/0.73 λL/1.041 λH/an ITO film 80 nm/1.04 λH/0.73 λL/0.22 λH/1.24 λL. Here, H represents a high refractive index material $Ta_2O_5$, and L represents a low refractive index material $SiO_2$, respectively. In addition, the wavelength λ is defined as 1,500 nm.

An absorption coefficient in the both wavelengths becomes 14.9% at λ=1,350 nm and 18.2% at λ=1,500 nm adding an optical path length difference. Therefore, in the spectral optical element according to the present embodiment, the diffraction efficiency of the first diffracted light at λ=1,350 nm is 74.9%, and the diffraction efficiency of the first diffracted light at λ=1,500 nm is 75.3%. As a result, it is possible to realize a spectral optical element with a very stable optical property, of which change of the diffraction efficiency is not more than 0.4% in a broad wavelength range, namely, λ=1,350 to 1,500 nm.

Second Embodiment

According to the first embodiment, the optical intensity attenuation amount in the optical phase control element is realized by absorption of the optical multilayer film, however, an object of the present embodiment is to stabilize an optical property with respect to two polarized waves, namely, the both of the TE mode and the TM mode in a broad wavelength range. Therefore, the reflection of the optical multilayer film and the transmission energy are designed for each wavelength so as to compensate for the wavelength dependency of the diffraction optical intensity. Thereby, it is possible to take out an even output energy over a broad wavelength band and to obtain a diffraction optical element having a small polarization dependency. This structure is preferable when a stable spectral property is needed in the broad band in a polarization optical system.

The spectral optical element has a structure that the laminar type transmission diffraction grating 22 as the transmission diffraction optical element is layered on the optical multilayer film 32 as the optical phase control element as same as the first embodiment (refer to FIG. 4). The laminar type transmission diffraction grating according to the present embodiment is formed by processing a $SiO_2$ layer having the refractive index 1.46, where a grating interval (pitch) is 2,500 nm, a depth of a groove of the grating is 5,100 nm, and a width of the ridge part 24 of the grating is 1,250 nm.

In this laminar type diffraction grating, the diffraction efficiency of the first diffracted light at λ=1,500 nm is 42% and the diffraction efficiency of the first diffracted light at λ1,1800 nm is 39% with respect to the TE mode incident light of 0° (vertical) input; the diffraction efficiency of the first diffracted light at λ=1,500 nm is 34% and the diffraction efficiency of the first diffracted light at λ=1,800 nm is 26% with respect to the TM mode incident light of 0° input; and the PDL is in the range of 0.9 to 1.8 dB with respect to λ=1,500 to 1,800 nm.

On the other hand, according to the present embodiment, a Si film with a refractive index, 3.57 and a film thickness, 50 nm is used as the optical film and the reflectance of the TE mode and the TM mode are controlled in response to a diffraction angle changing for each wavelength so that a product of the diffraction efficiency and the reflection amount by the optical multilayer film becomes constant and equal in the TE mode and the TM mode. As a result, the diffraction efficiency or the first order diffracted light at the wavelength λ=1,500 nm with respect to the TE mode is 27%; the diffraction efficiency of the first order diffracted light at the wavelength λ=1,600 nm with respect to the TE mode is 24%; the diffraction efficiency of the first order diffracted light at the wavelength λ=1,500 nm with respect to the TM mode is 27%; and the diffraction efficiency of the first order diffracted light at the wavelength λ=1,800 nm with respect to the TM mode is 22%. In addition, the PDL is in the range of 0 to 0.4 dB with respect to λ=1500 to 1600 nm, and it is possible to realize a spectral optical element with a stable optical property, of which change of the diffraction efficiency and the PDL is very small.

Third Embodiment

According to the present embodiment, a difference of the phase change amount in the TE and TM modes causes when passing through the diffraction optical element is corrected, and the optical phase control element is designed so as to compensate the mode dispersion between the polarized wave modes. The phase change amount is changed due to the refractive index of the material composing the diffraction grating and the width of the ridge. However, an equivalent dielectric constant received by each polarized light is different depending on a cyclic structure of the diffraction grating, so that the phase change amount is different.

For example, in the laminar type transmission diffraction grating according to the first embodiment, the polarized light in parallel with the groove of the diffraction grating, namely, the equivalent refractive index with respect to the TE mode is 1.37; and the polarized light vertical to the groove of the diffraction grating, namely, the equivalent refractive index with respect to the TM mode is 1.23; so that the equivalent refraction difference of the both is 0.14, and the phase difference of the both modes caused when transmitting through a diffraction grating layer of a depth of a groove, 2,400 nm is 0.26 λ when λ=1,350 nm and is 0.24 λ when λ=1,500 nm in consideration of the diffraction angle.

Figure 5:
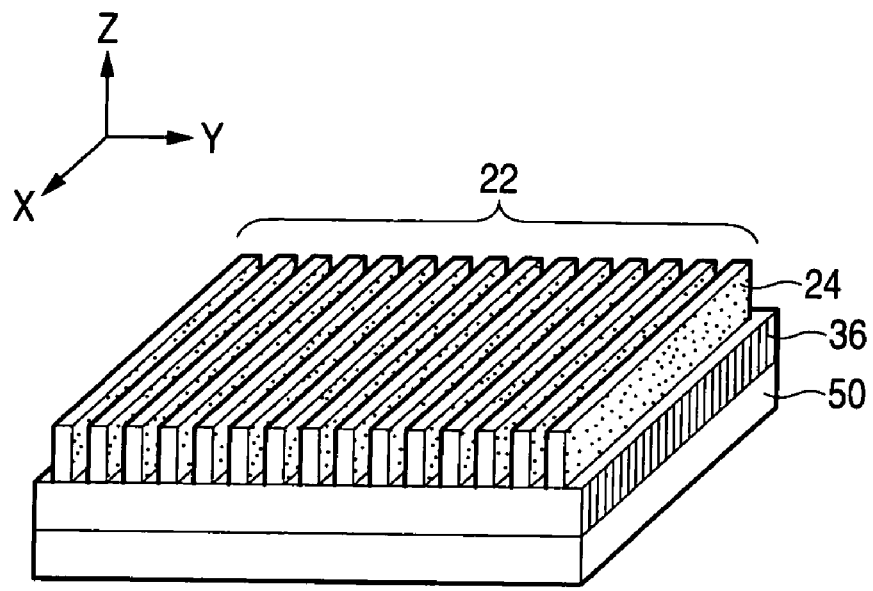
FIG. 5 is a schematic view showing the spectral optical element of a third embodiment.

As the optical phase control element according to the present embodiment, a cyclic structure that its code is adverse to the equivalent refractive index difference and its value is equal thereto and the diffracted light of ± first order becomes cut-off with respect to the used wavelength is used. According to the present embodiment, as shown in FIG. 5, a cyclic structural body 36 running at right angles to the cyclic structure in a Y direction composing the diffraction grating 22 and being in parallel with the surface of the substrate 50 is used. The structures of the diffraction grating 22 and the cyclic structural body 36 are designed so that the refractive indexes of the ridge parts are equal (the same materials are preferable) and the ratios of the widths of the ridge part and a gap part (a groove part) are equal. However, in order to cut off the diffracted light of the ± first order with respect to the used wavelength, a groove cycle of the cyclic structural body 36 is made smaller than that of the diffraction grating 22, namely, not more than ½ of the used wavelength. In the spectral optical element of the above-described structure, it is possible to compensate for the dispersion between the polarized modes caused at the diffraction grating part.

Specifically, the cyclic structural body 36 having the same structure as that of the laminar type transmission diffraction grating is formed on the surface of the substrate 50 as the optical phase control element. On this cyclic structural body 36, the diffraction grating 22 as same as the first embodiment is laminated and formed. The structures of the diffraction grating 22 and the cyclic structural body 36 are formed so that the cyclic directions are orthogonal under a condition satisfying the above-described relation. According to this structure, it is possible to realize the spectral optical element having a very small polarized mode dispersion, of which phase difference between the polarized modes is not more than 0.01 λ, in a broad wavelength range, namely, the wavelength 1,350 to 1,500 nm.

Fourth Embodiment

According to the present embodiment, not only transmission light of the optical phase control element but also the reflection light thereof is used.

The transmission diffraction grating has a nature that the 0 order diffracted light of λa and the m order diffracted light of λb are generated at equal diffraction angles if its incident light includes the first wavelength component of the wavelength λa and the second wavelength component of the wavelength λb that is 1/|m| of the first wavelength component (=λa/|m|, where m is an integer, of which absolute value is not less than 2), so that the available wavelength range (a so-called free specter range) is limited. Generally speaking, in the n order diffracted light of the first wavelength (the absolute value of n is an integer not less than 1) and the m order diffracted light of the second wavelength, when the first wavelength is m/n times the second wavelength, their diffraction angles are equal. However, the codes of m and n are equal, and m/n>0.

Figure 6:
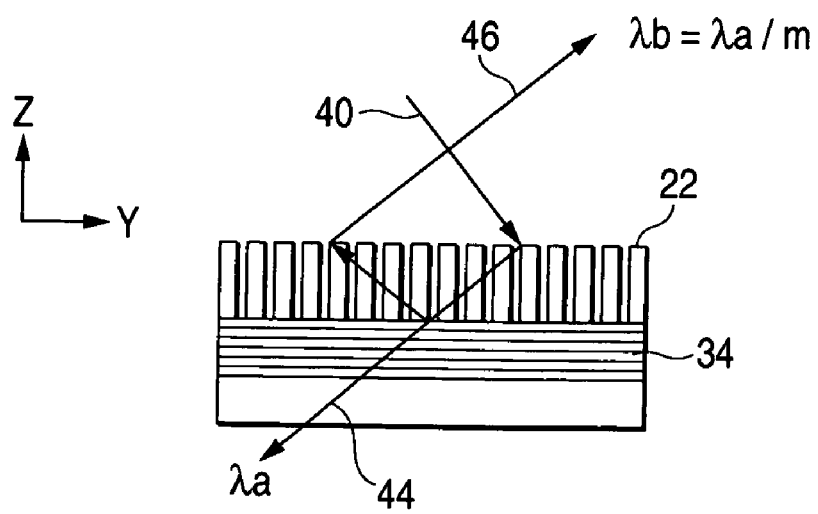
FIG. 6 shows an operational principle of a spectral optical element according to a fourth embodiment.

Therefore, as shown in FIG. 6, in the optical phase control element according to the present embodiment, passing the wavelength λa of the 0 order diffracted light 44 through it, a in order diffracted light 46 of a λb (=λa/|m|) inputted at the same diffraction angle is reflected.

According to the present invention, the diffraction grating 22 is laminated on an optical multilayer film 34 shown in FIG. 4. With respect to the laminar type transmission diffraction grating with a grating interval, 1,427 nm, the first order diffracted light in a wavelength range of λ=1,350 to 1,500 nm is diffracted at 17.6 to 21.6°, and at the sane time, the second order diffracted light in a wavelength of λ=675 to 750 nm is also diffracted at the same range of the angle. Accordingly, by constructing the laminar type transmission diffraction grating 22 as same as the first embodiment on the optical multilayer film 34 that is designed to be a wavelength transmission filter type of a cut-on wavelength 800 nm, it is possible to suppress the light amount of the second order diffracted light in the wavelength range of λ=675 to 750 nm not less than 40 dB, and practically, it is possible to realize the spectral optical element capable of constructing a spectral optical system in the wavelength range of 850 to 1,600 nm.

According to this structure, since the transmission of the high order diffracted light to be outputted from the diffraction grating 22 at the same diffraction angle, a very wide available wavelength band can be taken as the spectral optical element. For example, this structure is suitable when it is used in the wavelength range from a visible light to a near-infrared light for spectrum.

In addition, by making the first order diffracted light of the transmission diffraction grating the largest, the transmission of a higher harmonic wave can be suppressed even when the higher harmonic wave is sufficiently small from the beginning. Therefore, a S/N ratio of the wavelength of the output light can be improved and it is possible to take out the light of the wavelength with a high purity. In this case, particularly, this structure is suitable when it is used in the wavelength range from the visible light to the near-infrared light for a light source.

In addition, in place or a structure of a resonator according to the present invention, by partially reflecting the a order light, the light path can be returned to the light path of a mirror reflection with the same incident angle. Thereby, it is possible to realize the transmission diffraction optical element having an ad-drop function.

Fifth Embodiment

According to the present embodiment, the optical phase control element is designed to be a cyclic structure having a cycle not more than ½ of the wavelength with respect to a long wavelength band and it is designed to be acyclic structure having a cycle not less than ½ of the wavelength with respect to a short wavelength band.

Figure 7:
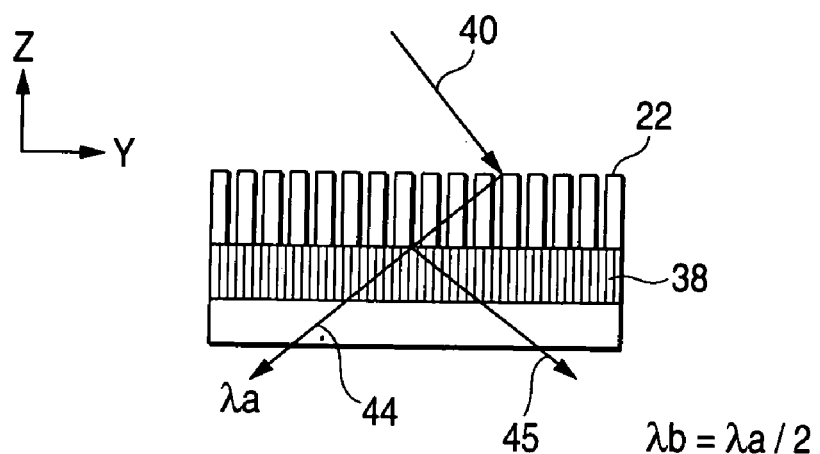
FIG. 7 shows an operational principle of a spectral optical element according to a fifth embodiment.

In this case, as shown in FIG. 7, the diffracted light 44 of the long wavelength band is not diffracted but is directly outputted, and a diffracted light 45 of the short wavelength band is diffracted in a cyclic structural body 38 as the optical phase control element to be outputted in another direction. Thereby, it is possible to simultaneously use these diffracted lights as the spectral optical elements for two wavelength bands. Accordingly, without switching two spectral optical elements, a stable optical evaluation in the broad band becomes possible while the spectral optical elements come to rest and are fixed. The structure of the present embodiment is suitable when it is used in the wavelength range from the visible light to the near-infrared light for spectrum.

Figure 8:
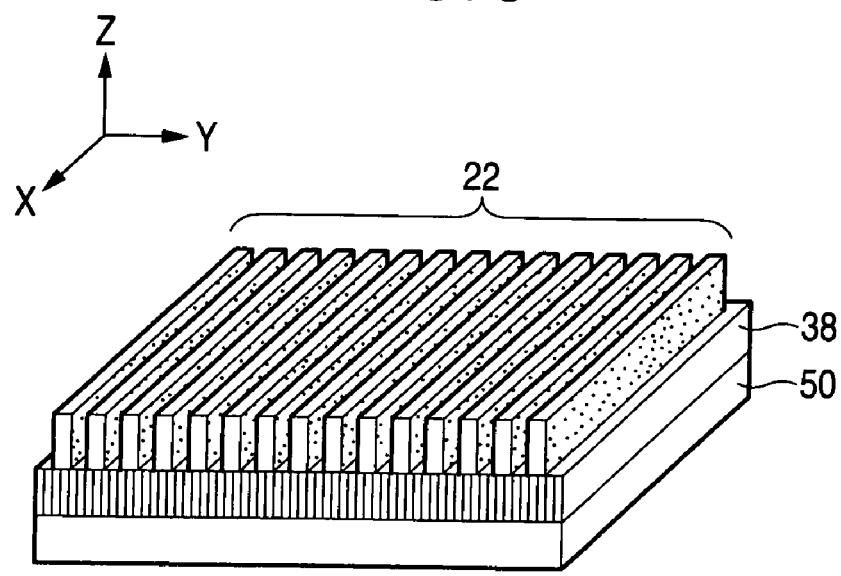
FIG. 8 is a schematic view showing the spectral optical element of the fifth embodiment.

According to the present embodiment, as the transmission diffraction grating, the laminar type transmission diffraction grating 22 as same as the first embodiment is used, and as the optical phase control element, the cyclic structural body 38 is used, which has a cycle in the Y diffraction as same as the diffraction grating 22 as shown in FIG. 8. As the optical phase control element, the laminar type cyclic structural body 38 is manufactured on the substrate 50 with a refractive index 1.6, a cycle 1,113.5 nm, and on this optical phase control element, the laminar type transmission diffraction gratings 22 as same as the first embodiment is arranged with the cyclic directions adjusted to manufacture the spectral optical element.

If the light of the wavelength 400 to 1,500 nm is inputted in this spectral optical element at the incident angle −27.5°, the light of the wavelength 1,350 to 1,500 nm is diffracted in the diffraction grating 22, and then, passing through the cyclic structural body 38, this light can be divided in the range of 17.6 to 21.6°. On the other hand, the light of the wave length 400 to 700 nm is diffracted in the diffraction grating 22, and then, it is diffracted at the cyclic structural body 38 of the optical phase control element once again to be divided in the range of −24.9 to −37. As a result, the spectral optical element in the broad range of the visible light to the infrared light can be realized.

In addition, according to the present embodiment, the cyclic structure of the transmission diffraction grating and the cyclic structure of the optical phase control element are arranged in parallel, however, by offsetting these structures from a parallel position, it is possible to change directions of diffraction and dispersion.

Sixth Embodiment

The above-described first to fourth embodiments are the means for obtaining a desired function by the design of the optical phase control element. On the contrary, according to the present embodiment, means for obtaining a desired function by a transmission diffraction grating will be described below.

As this meaning, the transmission diffraction grating is constructed by combining plural materials with different refractive indexes. In this case, obtaining products of refractive indexes of respective materials composing the transmission diffraction grating and cubic measures thereof, respectively, the material and the structure are selected so that a value obtained by dividing an average value of them by an entire cubic measure of the transmission diffraction grating is made into a design refractive index at a predetermined used wavelength. In other words, by adjusting a ratio of the cubic measure occupied by each material, the apparent refractive index or the transmission diffraction grating is made to coincide with a desired value (namely, a design refractive index). Thereby, a structure of the transmission diffraction grating with the optimum refractive index that is hard to obtain by a single material can be realized, and a spectral optical element having a large diffraction efficiency in a broad band to meet the design can be obtained.

Figure 9:
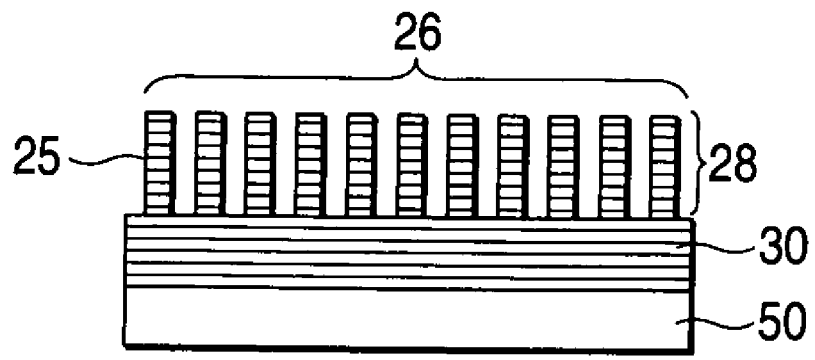
FIG. 9 is a sectional schematic view showing a spectral optical element according to a sixth embodiment.

According to the present embodiment, as shown in FIG. 9, on the optical phase control element 30, a multiple layer film 28 made of sixty pairs including $SiO_2$ of a refractive index 1.46 (a film thickness 30 nm), $Ta_2O_5$ of a refractive index 2.1 (a film thickness 10 nm) is deposited alternatively. Providing a stripe Cr mask on this surface, grooves are formed periodically by gas phase etching of $CF_4$ gas. Thereby, a laminar type transmission diffraction grating 26 having a grating interval of 1,427 nm, a width of a ridge part 25 of 799 nm, an average refractive index of 1.62, and a depth of a groove of 2,400 nm is manufactured.

Measuring the optical property of this laminar type transmission diffraction grating 26, in consideration of a TM mode diffraction efficiency 88%, a TE mode diffraction efficiency 72%, the blunt ridge shape, and the inclination (86°) of a vertical wall, a capability that is subsequently equal to the capability of the diffraction grating designed at the refractive index 88% including a TM mode diffraction efficiency calculated value 92% and a TE mode diffraction efficiency calculated value 90% is obtained. In this case, in order to prevent unnecessary interference, the film thickness or each layer is preferably not more than 1/30 of the wavelength.

According to the above-describe respective embodiments, to use the optical multiple layer film or the laminar type cyclic structural body as the optical phase control element is described, however, the present invention is not limited to this. If there is an incident angle dependency, other optical element may be available. A Holographic optical element, an optical crystal, a sub wavelength optical element, and a photonic crystal or the like are available.

In the case that these cannot be mounted by a method to directly deposit a film on the transmission diffraction optical element used for the optical multiple layer film, it is preferable that these are fixed by means of posting each other or the like. In addition, by preparing the substrate separately, the transmission diffraction optical element or the optical phase control element is arranged and fixed on this substrate.

Figure 10:
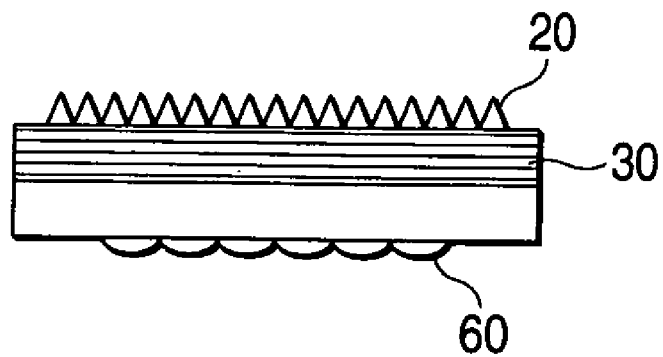
FIG. 10 is a sectional schematic view showing a spectral optical element according to the present invention having a lens mounted thereon.

The diffraction optical element according to the present embodiment may be mounted together with, for example, other elements to be used in inputting and outputting of the light on a predetermined substrate. For example, as shown in FIG. 10, the spectral optical element having the transmission diffraction optical element 20 and the optical phase control element 30 laminated thereon may be mounted together with the optical element such as a platy lens array 60 or the like.

What is claimed is:

1. A spectral optical element comprising:
   a transmission diffraction optical element to which an incident light is input with a predetermined incident angle, having a light output surface for outputting a diffracted light in a predetermined direction thereby effecting changes in the diffracted light depending on a wavelength of the incident light; and
   an optical phase control element opposed to the light output surface of the transmission diffraction optical element, said optical phase control element being composed of a plurality of layers aligned parallel to said light output surface,
   wherein the optical phase control element changes an optical function having an effect on the diffracted light depending on a diffraction angle of the diffracted light so as to compensate for said changes in the diffracted light effected by said diffraction optical element over a broad wavelength band.

2. The spectral optical element according to claim 1, wherein the optical phase control element changes at least one of an optical intensity attenuation amount, a phase change amount, and a reflection amount of the diffracted light depending on the diffraction angle.

3. The spectral optical element according to claim 1, wherein the transmission diffraction optical element and the optical phase control element are directly laminated.

4. The spectral optical element according to claim 1, wherein the optical phase control element gives a phase change amount having the value with the inverse code to a phase change amount of two orthogonal polarized lights that are diffracted by the transmission diffraction optical element.

5. The spectral optical element according to claim 1, wherein the optical phase control element comprises a cyclic structure having a cycle not more than ½ of the first wavelength and having a cycle not less than ½ of the second wavelength.

6. The spectral optical element according to claim 1, wherein the transmission diffraction optical element is constructed by combined two and more materials having different refractive indexes, and
   an apparent refractive index of the transmission diffraction optical element is made to coincide with a desired value depending on a cubic measure occupied each material.

7. The spectral optical element according to claim 1, wherein the optical phase control element includes an optical film.

8. The spectral optical element according to claim 7, wherein the optical phase control element includes an optical multilayer film.

9. The spectral optical element according to claim 1, wherein the optical phase control element includes a laminar type cyclic structure made of a transparent material in a used wavelength band.

10. The spectral optical element according to claim 1, wherein the transmission diffraction optical element includes an element having a cyclic concavo-convex structure made of a transparent material in a used wavelength band.

11. The spectral optical element according to claim 1, wherein the spectral optical element comprises a lens for condensing a light that is outputted from the optical phase control element.

12. The spectral optical element according to claim 1, wherein the transmission diffraction optical element in which the incident light is input to a surface other than the light output surface.

13. The spectral optical element according to claim 1, wherein said diffraction optical element includes a blaze type diffraction optical element.

14. The spectral optical element according to claim 1, wherein said diffraction optical element includes a lamina type diffraction optical element.

15. A spectral optical element comprising:
a transmission diffraction optical element to which an incident light is input with a predetermined incident angle, having a light output surface for outputting a diffracted light in a predetermined direction depending on a wavelength of the incident light; and
an optical phase control element opposed to the light output surface of the transmission diffraction optical element,
wherein the optical phase control element changes an optical function effecting on the diffracted light depending on a diffraction angle of the diffracted light,
wherein a product of a diffraction efficiency for a predetermined wavelength in the transmission diffraction optical element and an optical intensity attenuation amount of the predetermined wavelength in the diffracted light by the optical phase control element is constant in at least two different wavelength components of the diffracted light.

16. A spectral optical element composing:
a transmission diffraction optical element to which an incident light is input with a predetermined incident angle, having a light output surface for outputting a diffracted light in a predetermined direction depending on a wavelength of the incident light; and
an optical phase control element opposed to the light output surface of the transmission diffraction optical element,
wherein the optical phase control element changes an optical function effecting on the diffracted light depending on a diffraction angle of the diffracted light,
wherein a product of a diffraction efficiency for a predetermined wavelength in the transmission diffraction optical element and a reflection amount of the predetermined wavelength by the optical phase control element is constant in at least two different wavelength components of the diffracted light.

17. A spectral optical element composing:
a transmission diffraction optical element to which an incident light is input with a predetermined incident angle, having a light output surface for outputting a diffracted light in a predetermined direction depending on a wavelength of the incident light; and
an optical phase control element opposed to the light output surface of the transmission diffraction optical element,
wherein the optical phase control element changes an optical function effecting on the diffracted light depending on a diffraction angle of the diffracted light,
wherein when a diffraction angle of an n order diffracted light, where an absolute value of n is an integer not less than 1, of a first wavelength due to the transmission diffraction optical element is the same as that of a m order diffracted light, where an absolute value of m is an integer not less than 2, of a second wavelength that is shorter than the first wavelength and the light inputted in the optical phase control element is inputted from the same direction,
the light of the first wavelength is passed through the optical phase control element and the light of the second wavelength is reflected on the optical phase control element.

* * * * *